(12) United States Patent
Andres

(10) Patent No.: US 10,663,678 B2
(45) Date of Patent: May 26, 2020

(54) CONNECTOR AND METHOD FOR LOCKING AND/OR UNLOCKING A CONNECTOR

(71) Applicant: Reichle & De-Massari AG, Wetzikon (CH)

(72) Inventor: Hans Andres, Hinwil (CH)

(73) Assignee: Reichle & De-Massari AG, Wetzikon (CH)

( * ) Notice: Subject to any disclaimer, the term of this patent is extended or adjusted under 35 U.S.C. 154(b) by 0 days.

(21) Appl. No.: 16/334,443

(22) PCT Filed: Sep. 19, 2017

(86) PCT No.: PCT/EP2017/073629
§ 371 (c)(1),
(2) Date: Mar. 19, 2019

(87) PCT Pub. No.: WO2018/054898
PCT Pub. Date: Mar. 29, 2018

(65) Prior Publication Data
US 2019/0212503 A1    Jul. 11, 2019

(30) Foreign Application Priority Data

Sep. 22, 2016    (DE) .......................... 10 2016 117 909

(51) Int. Cl.
*G02B 6/38* (2006.01)

(52) U.S. Cl.
CPC ......... *G02B 6/3893* (2013.01); *G02B 6/3887* (2013.01); *G02B 6/3885* (2013.01)

(58) Field of Classification Search
None
See application file for complete search history.

(56) References Cited

U.S. PATENT DOCUMENTS

| | | |
|---|---|---|
| 5,915,056 A | 6/1999 | Bradley et al. |
| 2004/0247252 A1 | 12/2004 | Ehrenreich et al. |
| 2012/0057826 A1 | 3/2012 | Katoh |
| 2012/0308183 A1 | 12/2012 | Irwin et al. |
| 2013/0136398 A1 | 5/2013 | Isenhour et al. |
| 2014/0141641 A1 | 5/2014 | De Dios Martin et al. |
| 2017/0254961 A1 | 9/2017 | Kamada et al. |

FOREIGN PATENT DOCUMENTS

| | | |
|---|---|---|
| EP | 1 653 566 A1 | 5/2006 |
| FR | 1354923 A | 3/1964 |
| JP | 2016-062089 A | 4/2016 |

OTHER PUBLICATIONS

German Search Report dated May 11, 2017 issued in corresponding DE patent application No. 10 2016 117 909.4 (and English translation thereof).
International Preliminary Report dated Nov. 13, 2018 issued in corresponding international patent application No. PCT/EP2017/073629.
International Search Report dated Jul. 11, 2017 issued in corresponding international patent application No. PCT/EP2017/073629.

*Primary Examiner* — Jerry Rahll
(74) *Attorney, Agent, or Firm* — Posz Law Group, PLC

(57) ABSTRACT

A connector, in particular an optical connector, has a plug unit, has a locking unit, which can be moved in translational fashion relative to the plug unit and, in a coupled state, is configured for locking the plug unit, and having a cable-kink protector, wherein
the cable-kink protector is configured for actuating the locking unit directly.

16 Claims, 6 Drawing Sheets

CONNECTOR AND METHOD FOR LOCKING AND/OR UNLOCKING A CONNECTOR

CROSS REFERENCE TO RELATED APPLICATIONS

Figure 1:
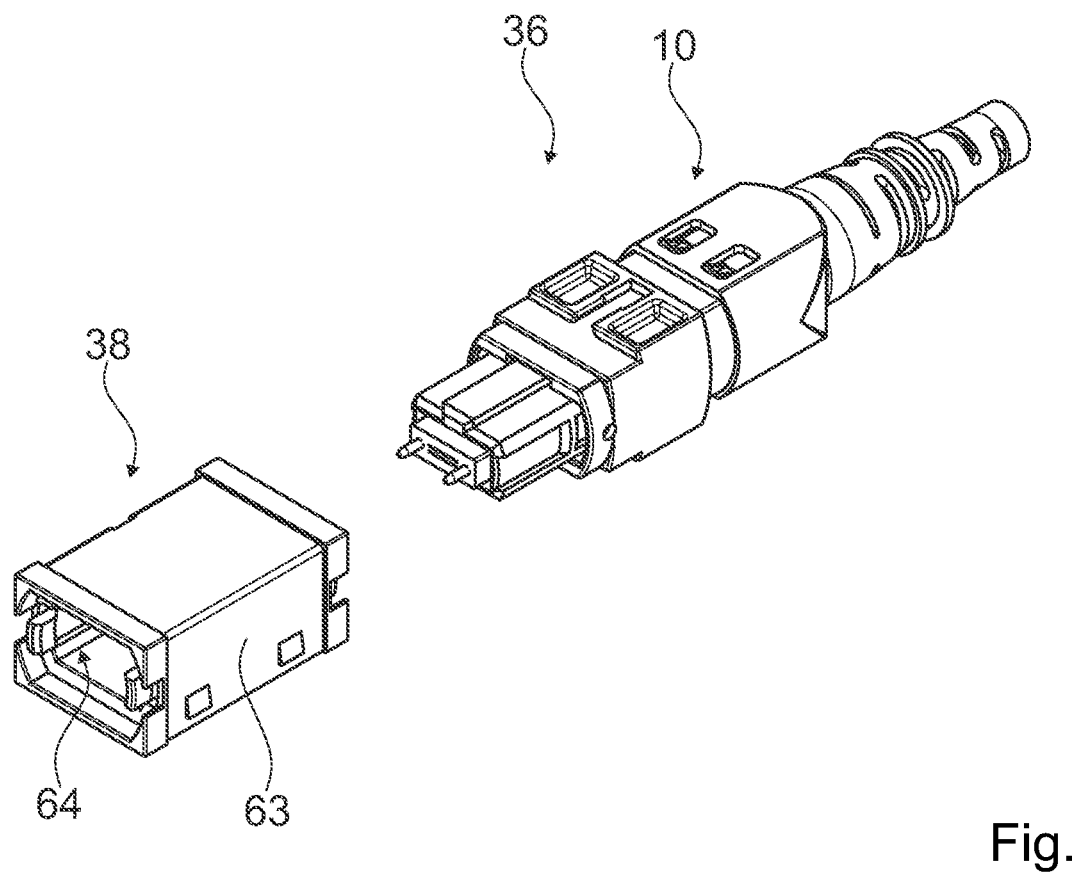

This application is a U.S. national stage application of PCT/EP2017/073629 filed on Sep. 19, 2017, which is based on German Patent Application No. 10 2016 117 909.4 filed on Sep. 22, 2016, the contents of which are incorporated herein by reference.

PRIOR ART

The invention relates to a connector according to the preamble of claim 1 and to a method for locking and/or unlocking a connector according to the preamble of claim 15.

The prior art discloses MPO connectors having a plug unit, having a locking unit, which can be moved in translational fashion, and having a cable-kink protector, wherein the plug unit is locked and/or unlocked by means of the locking unit being subjected to a translational tensile force.

WO 2012/151175 A2 discloses a connector having a plug unit, which has two plug elements, having a locking unit, which cannot be moved in translational fashion, and having a cable-kink protector, which serves for actuating the locking unit.

In addition, U.S. Pat. No. 9,146,351 B2 discloses an MPO connector having a plug unit, having a locking unit, which can be moved in a translational fashion, and having a housing unit, which serves for actuating the locking unit. In this case, however, the housing unit is not designed in the form of a cable-kink protector.

Furthermore, U.S. Pat. No. 9,239,437 B2 discloses an MPO connector having a plug unit and having a locking unit, which can be moved in translational fashion, wherein the plug unit is locked and/or unlocked by means of a separate actuating tool, which can be fastened on the locking unit.

The object of the invention is, in particular, to provide a connector of the type in question which has improved properties as far as flexibility is concerned. The object is achieved by the characterizing features of patent claims 1 and 15, while advantageous configurations and developments of the invention can be gathered from the dependent claims.

Advantages of the Invention

The invention proceeds from a connector, in particular an optical connector, in particular for data-transmission and/or telecommunications purposes, having a plug unit, having a locking unit, which can be moved in translational fashion relative to the plug unit, in particular can be displaced linearly in the longitudinal-extent direction of the plug unit, and, in an, in particular fully, coupled and/or installed state, is configured for locking the plug unit, advantageously in a socket, for example an adapter and/or a coupling, corresponding to the plug unit, and having a cable-kink protector.

It is proposed that the cable-kink protector, in particular at least in the, in particular fully, coupled and/or installed state, should be configured for direct actuation, in particular locking, unlocking, movement and/or disengagement, of the locking unit. "Configured" should be understood to mean, in particular, specifically designed and/or equipped. That an object is configured for a certain function should be understood to mean, in particular, that the object performs and/or executes this certain function in at least one use and/or operating state. A "longitudinal-extent direction" of an object should be understood to mean, in particular, a direction which runs parallel to a direction of maximum extent of the object.

A "connector" should be understood here to mean, in particular, at least a part, in particular a subassembly, of a connector system. The connector system advantageously also comprises at least one socket, which corresponds in particular to the connector and to which the connector can be coupled. The connector can be designed here, in particular, in the form of any desired magnetic, electrical and/or advantageously optical connector, in particular in the form of a single, simplex, dual, duplex, multiple and/or multiplex connector. It is particularly preferable, however, for the connector to be designed in the form of an MPO connector and/or MTP connector. A "plug unit" should be understood here to mean, in particular, a unit which is configured for connection to the socket and advantageously for plugging into the socket and, for this purpose, comprises in particular at least one, advantageously precisely one, plug element. The plug unit is advantageously configured here to establish and/or to allow at least one magnetic, electrical and/or advantageously optical connection between two different objects.

The plug unit has, in particular, a latch element, which is configured, in particular, for coupling to a further latch element, in particular the socket. The latch element is preferably designed in the form of a latching edge and is particularly advantageously at least essentially non-elastic. The further latch element is preferably designed in the form of an at least essentially elastic latching arm. "At least essentially" elastic or non-elastic should be understood to mean, in particular, elastic or non-elastic in the technical sense, in particular when viewed macroscopically.

In addition, a "locking unit" should be understood to mean, in particular, a unit which is formed in particular separately from the plug unit, is advantageously coupled to the plug unit, in particular in a force-fitting and/or form-fitting manner, and/or can be coupled thereto, in particular in a force-fitting and/or form-fitting manner, and is configured for, advantageously direct, locking of the plug unit in the socket, in particular such that removal of the plug unit from the socket, in particular without actuation of the locking unit, is prevented. In particular, the locking unit here, for unlocking and/or locking of the plug unit, in particular in the socket, can be moved, and advantageously displaced, in translational fashion relative to the plug unit from at least one first position, in particular a locking position, into at least one second position, in particular an unlocking position, and vice versa. In addition, the locking unit is particularly advantageously mounted in a resilient manner, in particular by means of at least one spring element of the connector, and, in particular starting from the at least one second position, moves back automatically into the first position. The locking unit particularly preferably engages around the plug unit here at least largely and particularly preferably fully. The expression "at least largely" should be understood here to mean, in particular, at least 55%, advantageously at least 65%, preferably at least 75%, particularly preferably at least 85% and particularly advantageously at least 95%.

Furthermore, a "cable-kink protector" should be understood to mean, in particular, a unit which is formed in particular separately from the plug unit and/or the locking unit and is configured, in particular, for accommodating at least one cable connected to the plug unit and for protecting the same, in particular, against excessive stressing, in particular kinking, excessive bending and/or tensile stressing. For this purpose, the cable-kink protector preferably has a cable-protection portion, which advantageously has at least one entry opening for the cable and at least one exit opening for the cable, said exit opening being oriented preferably parallel to the entry opening. It is preferably the case, in addition, that the cable-kink protector can be moved at least partially and/or at least section-wise in a direction other than the longitudinal-extent direction of the plug unit. In particular, the cable-kink protector here defines a minimum bending radius for the at least one cable. In addition, the cable-kink protector is, in particular, in operative connection with the locking unit and establishes advantageously direct contact with the locking unit. For this purpose, the cable-kink protector preferably has an actuation portion. The cable-kink protector thus has, in particular, a double function and allows, on the one hand, effective protection, in particular kink protection, for the at least one cable and, on the other hand, locking and/or unlocking, and thus in particular a plugging-in and/or an unplugging operation, of the connector by means of a force to which the cable-kink protector is subjected. This configuration can provide a connector which has improved properties as far as flexibility is concerned. In particular, it is possible here to achieve advantageous actuation, in particular a plugging-in and/or unplugging operation, of the connector by means of the cable-kink protector, in particular even in very confined environments. In particular, an advantageously straightforward plugging-in and/or unplugging operation of a connector can be achieved even in confined spaces and/or in the case of a multiplicity of connectors arranged one beside the other. In addition, it is possible to simplify handling of the connector, in particular during a plugging-in operation and/or an unplugging operation. Furthermore, it is advantageously possible to improve efficiency, in particular efficiency in respect of installation space, components, manufacturing, maintenance and/or costs.

The cable-kink protector can preferably be moved in translational fashion relative to the plug unit, in particular linearly in the longitudinal-extent direction of the plug unit, as a result of which it is possible to simplify, in particular, a plugging-in operation and/or an unplugging operation. The cable-kink protector here is advantageously free of any direct connection to the plug unit.

In addition, it is proposed that the cable-kink protector should be connected in a movable manner to the locking unit, preferably such that it can be moved in translational fashion and particularly preferably linearly in the longitudinal-extent direction of the plug unit. It is advantageous here for the cable-kink protector to be connected to the locking unit in a force-fitting and/or form-fitting manner. In particular, it is possible for the cable-kink protector to comprise, for connection to the locking unit, at least one retaining element and for the locking unit to comprise at least one further retaining element, which corresponds to the retaining element. The retaining element of the cable-kink protector here is advantageously arranged in the actuation portion of the cable-kink protector. This makes it possible to achieve, in particular, an advantageous reduction in the amount of space required for actuation of the locking unit.

Furthermore, it is proposed that the cable-kink protector should be configured in such a way that an, in particular translational, force, in particular compressive force and/or tensile force, to which the cable-kink protector is subjected, in particular by a user, is transmitted, in particular directly, to the locking unit, in order to actuate the locking unit, preferably in order to release at least one locking means, and advantageously at the same time in order to allow removal of the connector, in particular by means of the, in particular translational, force, in particular tensile force, to which the cable-kink protector is subjected. This can achieve, in particular, a configuration which requires virtually no extra installation space and, at the same time, an unplugging operation which is advantageously user-friendly.

In particular, the locking unit could engage at least partially, preferably at least largely and particularly preferably fully, around the cable-kink protector. In an advantageous configuration of the invention, however, it is proposed that the cable-kink protector should engage at least partially, preferably at least largely and particularly preferably fully, around the locking unit. This makes it possible to provide, in particular, an advantageously robust connector. In addition, straightforward assembly of the connector can advantageously be achieved.

In addition, it is proposed that the cable-kink protector should have at least one actuation element, preferably designed in the form of a stop element, and preferably at least two, advantageously at least three and particularly preferably at least four, actuation elements, preferably designed in the form of stop elements, for direct actuation of the locking unit. The actuation element and/or the actuation elements advantageously establishes/establish contact with the locking unit here, at least during a plugging-in operation and/or an unplugging operation, directly, in particular such that an in particular translational force, in particular compressive force and/or tensile force, to which the cable-kink protector is subjected is transmitted to the locking unit. The actuation element and/or the actuation elements here is/are advantageously arranged in the actuation portion of the cable-kink protector. In particular, at least one of the actuation elements can be identical, at least partially, to the retaining element. This can achieve, in particular, advantageous force transmission from the cable-kink protector to the locking element.

The cable-kink protector could be formed, for example, in more than one part. In a particularly preferred configuration of the invention, however, it is proposed that the cable-kink protector should be implemented in one piece. "Implemented in one piece" should be understood here to mean, in particular, connected at least integrally and/or implemented together. The integral connection can be produced, for example, by an adhesive-bonding process, an injection-molding process, a welding process, a soldering process and/or some other process. In one piece should advantageously be understood to mean formed from a single piece and/or in a single piece. This single piece is preferably produced from an individual blank, substance and/or casting, for example by extrusion, in particular extrusion involving one and/or more components, and/or injection molding, in particular injection molding involving one and/or more components. This can provide, in particular, an advantageously robust cable-kink protector. In addition, it is possible to reduce the level of kink-protection complexity, in comparison with known solutions. Furthermore, in particular a production process can be simplified.

In addition, it is proposed that the cable-kink protector should have an actuation portion, in particular the already previously mentioned actuation portion, which has rotational symmetry of order 2, in particular in relation to at least one rotational-symmetry axis which is parallel to the longitudinal-extent direction of the plug unit. "Rotational symmetry of order n" of an object is intended to mean, in particular, that the object can be rotated n times through an identical angle of rotation, in particular smaller than 360°, in particular about the rotational-symmetry axis and, during each rotation, is mapped onto itself, wherein an angle of 360° is reached and/or covered in particular following n rotations. This makes it possible to simplify, in particular, production and/or assembly.

A particularly compact configuration and/or an advantageously high level of protection can be achieved, in particular, when the cable-kink protector has a cable-protection portion, in particular the already previously mentioned cable-protection portion, which is at least section-wise rotationally symmetrical, advantageously in relation to the longitudinal-extent direction of the plug unit.

In a further configuration of the invention, it is proposed that the cable-kink protector should be of at least partially, preferably at least largely and particularly preferably fully, flexible, and advantageously elastic, design. A "flexible object" should be understood here to mean, in particular, an object which has at least one sub-region and/or at least one part which, in a normal operating state, can be altered at least in its position by at least 0.1 cm, preferably by at least 0.5 cm and particularly preferably by at least 1 cm. In particular, the flexible object is deformable on a repeated basis, in particular without sustaining any damage. In addition, an "elastic object" should be understood to mean, in particular, an object which has at least one sub-region and/or at least one part which, in a normal operating state, can be altered elastically at least in its position by at least 0.1 cm, preferably by at least 0.5 cm and particularly preferably by at least 1 cm, and which generates in particular an opposing force which is dependent on an alteration in the position, is preferably proportional to the alteration and counteracts, in particular, the alteration. In particular, the elastic object is deformable on a repeated basis, in particular without sustaining any damage, and, in particular following deformation, tends automatically again toward a basic shape. In particular in this case, the cable-kink protector consists at least partially, preferably at least largely and particularly preferably fully, of a flexible, and preferably elastic, material. The flexible and advantageously elastic material here can be, in particular, a silicone, an elastomer, a thermoplastic material, a rubber, a rubber-like material and/or any other desired plastic with corresponding properties. It is thus possible to achieve, in particular, advantageous flexibility of the cable-kink protector.

The cable-kink protector preferably has a minimum bending radius of at least 10 mm, advantageously of at least 15 mm and particularly preferably of at least 20 mm. The minimum bending radius is advantageously between 10 mm and 100 mm. A minimum bending radius of the cable-kink protector is particularly advantageously dimensioned such that an increase in damping of the at least one cable is at most 0.2 dB. This can advantageously prevent damage to cables connected to the plug unit.

It would be possible for the cable-kink protector to correspond, for example, to a fully closed body and to consist of a correspondingly soft and/or flexible material, in particular a thermoplastic material. In particular in order to improve the level of protection provided by the cable-kink protector, however, it is proposed that the cable-kink protector has at least one bending recess, which is configured for altering, in particular for reducing, rigidity, in particular bending rigidity, of the cable-kink protector. The cable-kink protector here advantageously has a plurality of, for example at least two, at least four and/or at least six, bending recesses.

The invention additionally proceeds from a method for locking and/or unlocking a connector, in particular an optical connector, in particular for data-transmission and/or telecommunications purposes, the connector having a plug unit, having a locking unit, which can be moved in translational fashion relative to the plug unit, in particular can be displaced linearly in the longitudinal-extent direction of the plug unit, and, in an, in particular fully, coupled and/or installed state, is configured for locking the plug unit, advantageously in a socket, for example an adapter and/or a coupling, corresponding to the plug unit, and having a cable-kink protector.

It is proposed that the locking unit, in particular at least in the, in particular fully, coupled and/or installed state, is directly actuated, in particular locked, unlocked, moved and/or disengaged, by means of the cable-kink protector. This makes it possible to improve, in particular, flexibility. In particular, it is possible here to achieve advantageous actuation, in particular a plugging-in and/or unplugging operation, of the connector by means of the cable-kink protector, in particular even in very confined environments. In particular, an advantageously straightforward plugging-in and/or unplugging operation of a connector can be achieved even in confined spaces and/or in the case of a multiplicity of connectors arranged one beside the other. In addition, it is possible to simplify handling of the connector, in particular during a plugging-in operation and/or an unplugging operation. Furthermore, it is advantageously possible to improve efficiency, in particular efficiency in respect of installation space, components, manufacturing, maintenance and/or costs.

The connector and the method for locking and/or unlocking the connector should not be restricted here to the above described use and embodiment. In particular, for the purpose of performing a function described herein, it is possible for the connector and the method for locking and/or unlocking the connector to have a number of individual elements, components and units which differs from a number mentioned herein.

DRAWINGS

Further advantages can be gathered from the following description of the drawings. The drawings illustrate an exemplary embodiment of the invention. The drawings, the description and the claims contain numerous features in combination. A person skilled in the art will expediently also consider the features individually and combine them to form other advantageous combinations.

Figure 2:
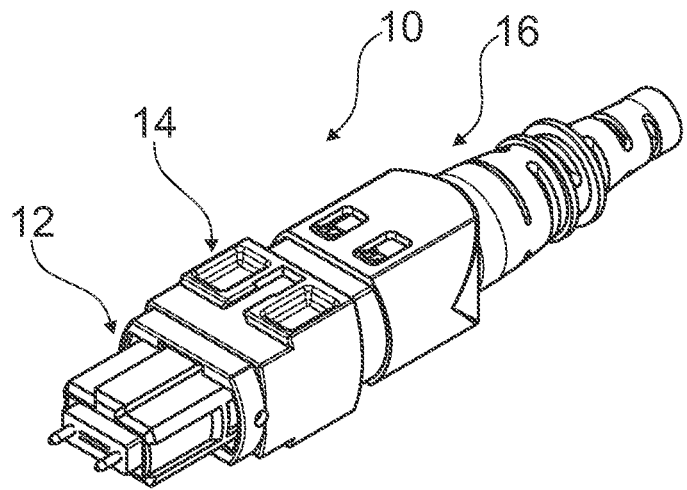
Figure 3:
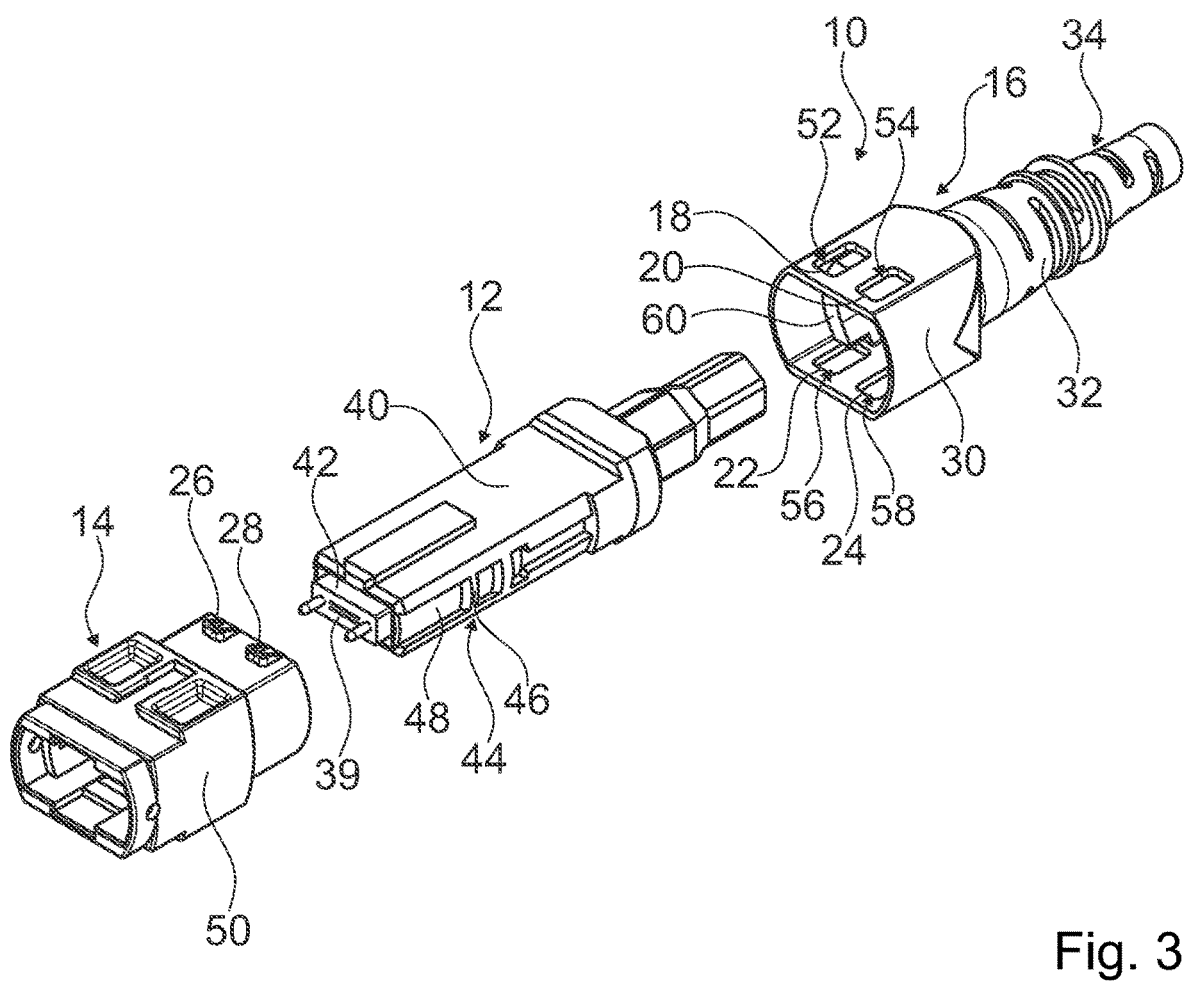
Figure 4:
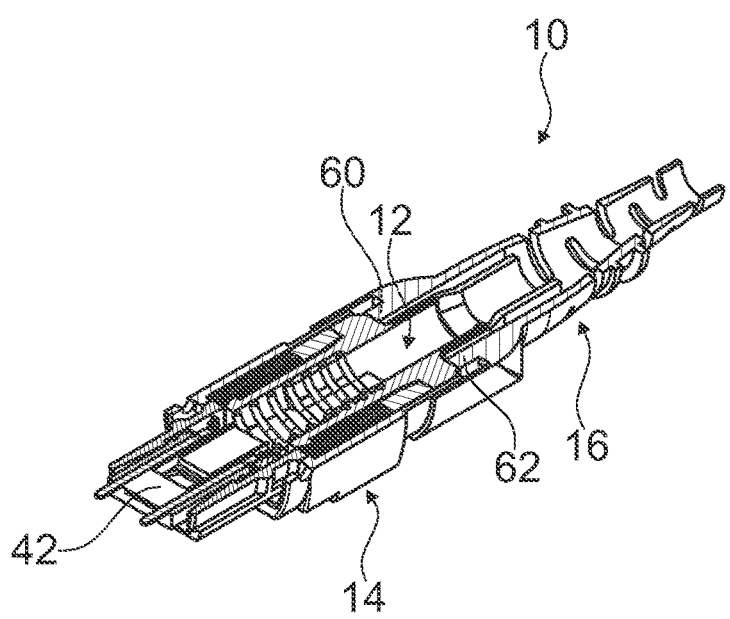
Figure 5:
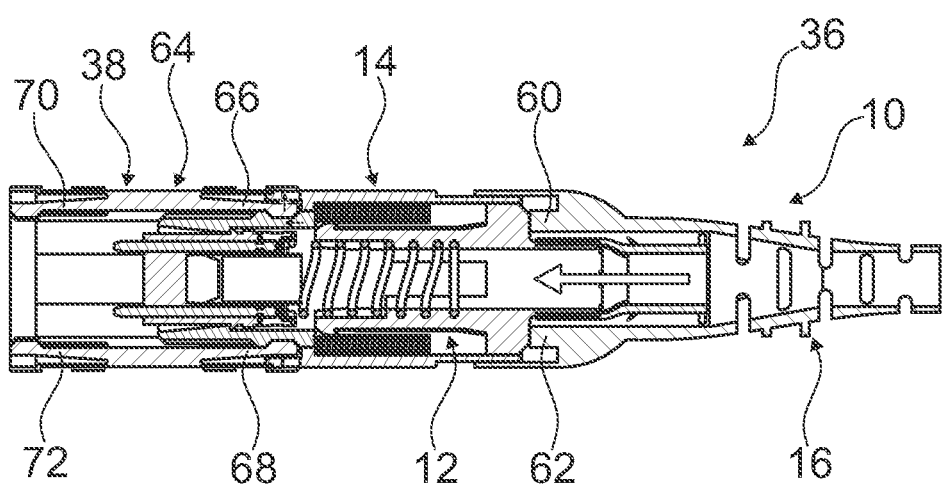
Figure 6A:
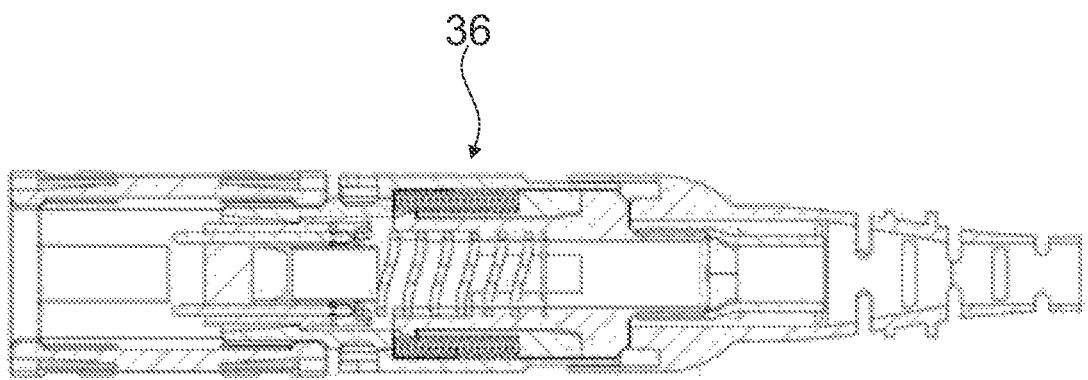
Figure 6B:
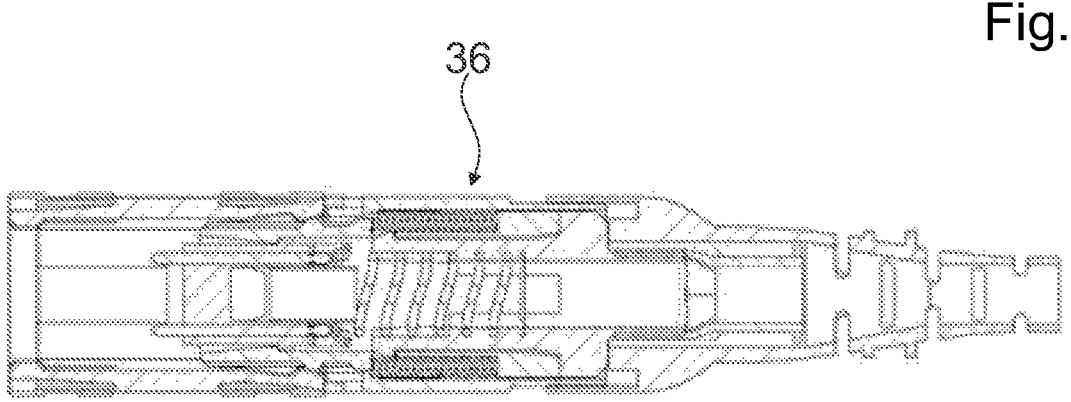
Figure 6C:
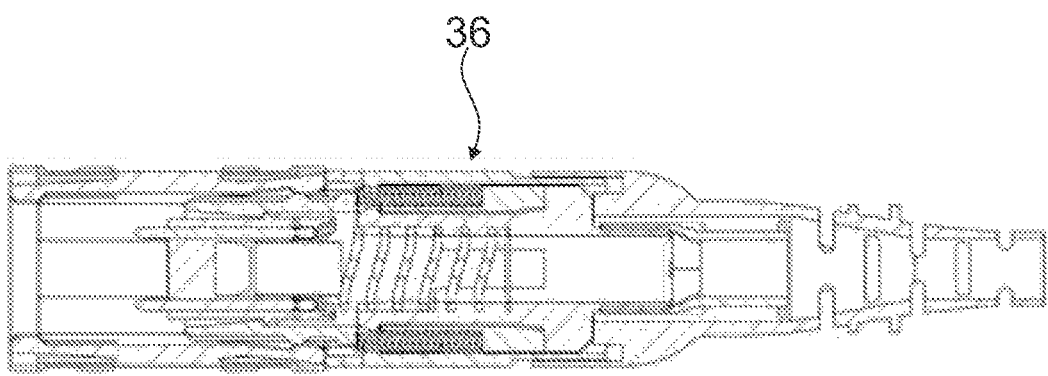
Figure 6D:
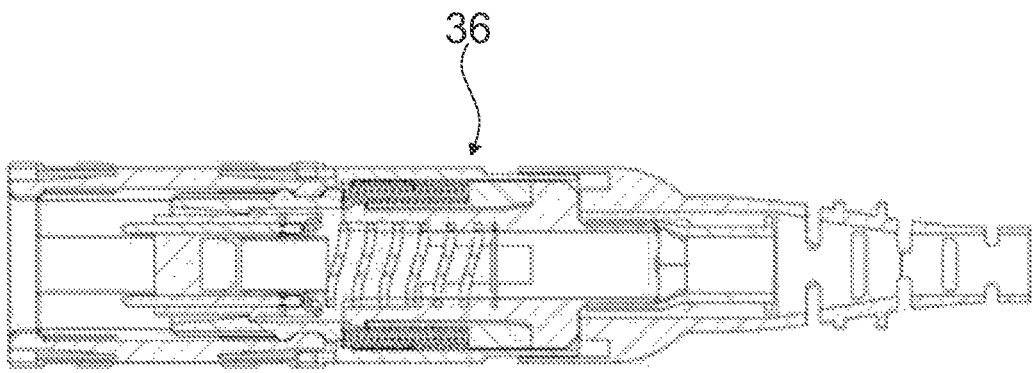
Figure 7:
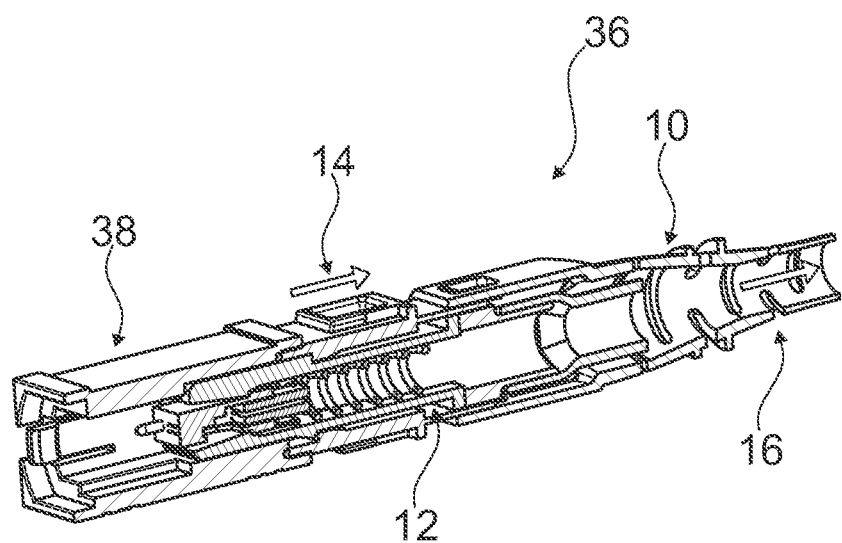
Figure 8A:
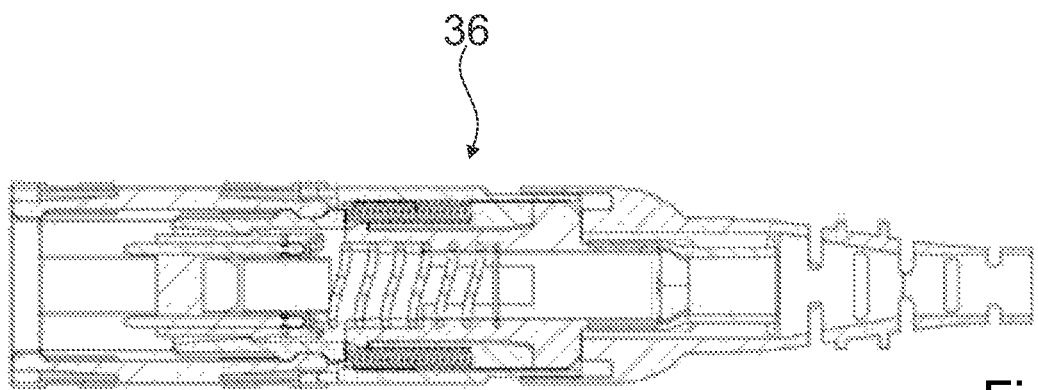
Figure 8B:
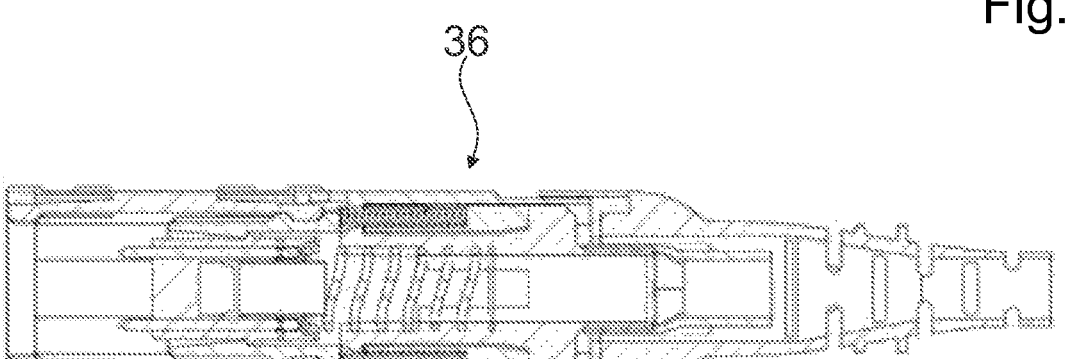
Figure 8C:
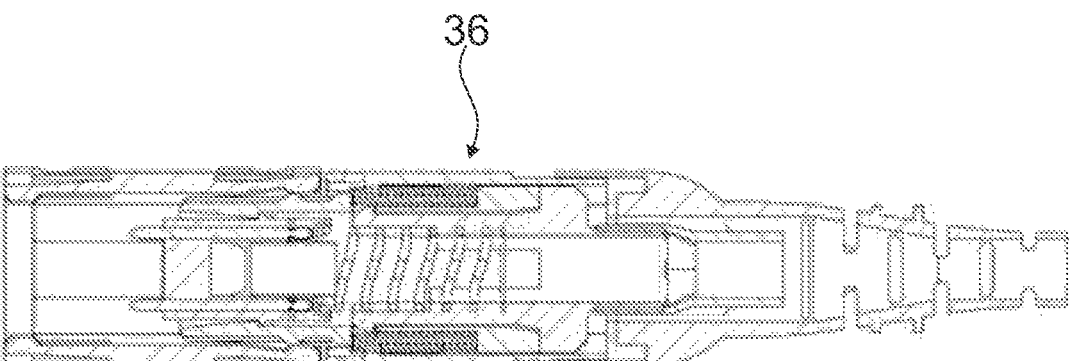
Figure 8D:
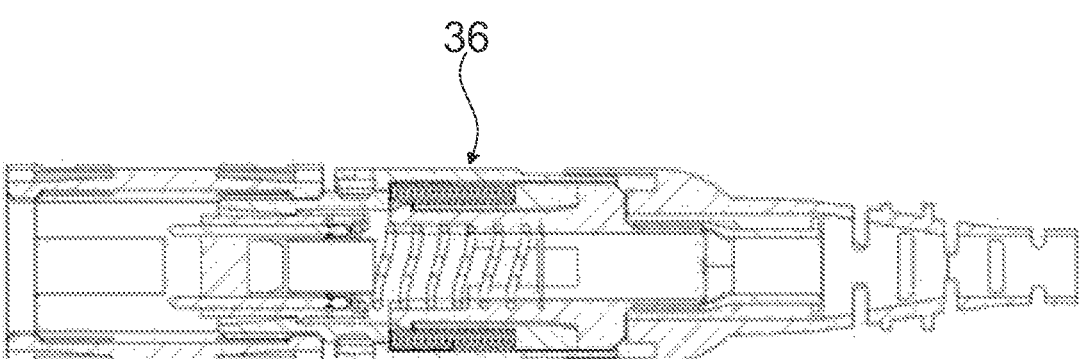

In the drawings:

FIG. 1 shows a connector system having a connector, which is designed by way of example in the form of an optical connector, and having a socket, which corresponds to the connector, FIG. 2 shows a first perspective view of the connector, FIG. 3 shows an exploded illustration of the connector, FIG. 4 shows a sectional illustration of the connector, FIG. 5 shows the connector system during an operation of the connector being plugged into the socket, FIGS. 6a-d show a course followed by the plugging-in operation from FIG. 5, FIG. 7 shows the connector system during an operation of the connector being unplugged from the socket, and FIGS. 8a-d show a course followed by the unplugging operation from FIG. 7.

DESCRIPTION OF THE EXEMPLARY EMBODIMENT

FIG. 1 shows an exemplary connector system 36 having a connector 10, which is designed by way of example in the form of an optical connector, and having a socket 38. The connector 10 is designed in the form of a multiple and/or multiplex connector. In the present case, the connector 10 is designed in the form of an MPO connector. As an alternative, however, it would also be possible for a connector to be designed in the form of an electrical connector or the like. In addition, it would also be possible, in principle, for a connector to be designed in the form of a simplex connector and/or duplex connector.

The connector 10 is configured for coupling to the socket 38 (cf. also FIGS. 5, 6a-d, 7 and 8a-d), which corresponds to the connector 10. In the present case, the socket 38 is designed in the form of a coupling, in particular one which is known per se. The socket 38 is implemented in one piece. The socket 38 is configured for accommodating and/or connecting two connectors 10.

For this purpose, the socket 38 comprises a main socket body 63. The main socket body 63 is of at least essentially cuboidal design. In addition, the main socket body 63 is hollow.

Furthermore, the socket 38 comprises a latch unit 64. The latch unit 64 is arranged on an inner side of the main socket body 63. The latch unit 64 comprises four latch elements 66, 68, 70, 72 (cf. in particular, also FIG. 5). In each case two of the latch elements 66, 68, 70, 72 here are assigned to one of the connectors 10. In addition, the latch elements 66, 68, 70, 72 are at least essentially identical to one another. In the present case, the latch elements 66, 68, 70, 72 are designed in the form of latching arms. As an alternative, however, it would also be possible for a socket to be designed in the form of a non-coupling-like adapter and/or connection for example for a printed circuit board. In addition, it would also be possible for a latch unit to have a different number of latch elements, for example two latch elements.

FIGS. 2 to 4 show a perspective view (cf. FIG. 2), an exploded illustration (cf. FIG. 3) and a sectional illustration (cf. FIG. 4) of the connector 10.

The connector 10 comprises a plug unit 12 which is known per se. The plug unit 12 is of elongate design. The plug unit 12 here defines a longitudinal-extent direction of the connector 10. In an installed state, the plug unit 12 has been accommodated and/or plugged into the socket 38. A contact side and/or a side of the plug unit 12 which, in the installed state, is directed toward the socket 38 defines a front side 39 of the connector 10. The plug unit 12 is configured for establishing an optical connection between two objects.

The plug unit 12 comprises a main plug body 40. The main plug body 40 is of at least essentially cuboidal design. The main plug body 40 is designed in the form of an accommodating body. The main plug body 40 forms, at least partly, an outer housing of the connector 10. At least a large portion of the components required for a functionality of the plug unit 12 are arranged within the main plug body 40.

In addition, the plug unit 12 comprises at least one plug element 42. In the present case, the plug unit 12 comprises precisely one plug element 42. However, it would also be possible, in principle, for a plug unit to have two plug elements and/or three plug elements. The plug element 42 is mounted within the main plug body 40. The plug element 42 is designed in the form of an MPO plug element.

Furthermore, the plug unit 12 comprises a further latch unit 44. The further latch unit 44 is arranged on an outer side of the main plug body 40. In a state in which it is coupled to the latch unit 64 of the socket 38, the further latch unit 44 forms a latching connection.

For this purpose, the further latch unit 44 comprises two further latch elements 46, just one of the further latch elements 46 being illustrated in FIG. 2. The further latch elements 46 are at least essentially identical to one another. The further latch elements 46 are arranged on opposite side surfaces of the main plug body 40. The further latch elements 46 are designed to correspond to the latch elements 66, 68, 70, 72, in particular the latch elements 66, 68, 70, 72 assigned to the connector 10. In the present case, the further latch elements 46 are designed in the form of latching edges.

In addition, the further latch unit 44 comprises two latching guides 48, just one of the latching guides 48 being illustrated in FIG. 2. The latching guides 48 are at least essentially identical to one another. The latching guides 48 are arranged on opposite side surfaces of the main plug body 40. In the present case, the latching guides 48 are designed in the form of depressions in the main plug body 40. The latching guides 48 here directly adjoin the further latch elements 46. The latching guides 48 serve, during a coupling operation, for guiding the latch elements 66, 68, 70, 72, in particular the latch elements 66, 68, 70, 72 assigned to the connector 10. As an alternative, however, it would also be possible for a further latch unit to have a different number of further latch elements and/or latching guides, for example at least four further latch elements and/or latching guides. In addition, it is also conceivable, in principle, to dispense with latching guides.

Furthermore, the connector 10 comprises a locking unit 14. The locking unit 14 is formed separately from the plug unit 12. The locking unit 14 is implemented in one piece. As an alternative, however, it would also be possible for a locking unit to be embodied in a multi-part implementation. The locking unit 14 forms, at least partially, an outer housing of the connector 10. The locking unit 14 comprises a main locking body 50. The main locking body 50 is designed to correspond to the main plug body 40. In the installed state, the main locking body 50 has been coupled to the main plug body 40 in a force-fitting and/or form-fitting manner. In the installed state, the main locking body 50 engages fully around the main plug body 40.

In addition, the locking unit 14 comprises at least one retaining element 26, 28. In the present case, the locking unit 14 comprises four retaining elements 26, 28, just two of the retaining elements 26, 28 being illustrated in particular in FIG. 2. The retaining elements 26, 28 are at least essentially identical to one another. The retaining elements 26, 28 are arranged on an outer side of the main locking body 50. The retaining elements 26, 28 are arranged on cover surfaces of the main locking body 50, said cover surfaces being oriented in particular parallel to a main-extent plane of the locking unit 14. In the present case, two of the retaining elements 26, 28 are arranged on each of the cover surfaces. The retaining elements 26, 28 are arranged on a side of the main locking body 50 which is directed away from the front side 39. The retaining elements 26, 28 are designed in the form of retaining protrusions. As an alternative, however, it would also be possible for a locking unit to have a different number of retaining elements, for example precisely one retaining element, two retaining elements and/or six retaining element.

In addition, in a fully coupled state and/or installed state, the locking unit 14 is configured for locking the plug unit 12 in the socket 38, in particular such that removal of the plug unit 12 from the socket 38 without actuation of the locking unit 14 is prevented.

For this purpose, the locking unit 14 is mounted in a movable manner relative to the plug unit 12. The locking unit 14 can be moved in translational fashion relative to the plug unit 12, in the present case can be displaced, in particular, linearly in the longitudinal-extent direction of the plug unit 12. The locking unit 14 here can be moved from at least one first position, in particular a locking position, into at least one second position, in particular an unlocking position, and vice versa. In the first position, the main locking body 50 engages at least largely around the further latch unit 44 and, in particular, engages fully around the further latch elements 46 of the further latch unit 44. In the first position, removal of the plug unit 12 from the socket 38 is blocked and/or prevented. In the second position, which is illustrated in particular also in FIG. 1, the further latch unit 44, in contrast, is freely accessible. In the second position, removal of the plug unit 12 from the socket 38 is possible. In the present case, the locking unit 14 is, in addition, mounted in a resilient manner and, following deflection, moves back in particular automatically into the first position. In the fully installed state and/or coupled state, the locking unit 14 here is arranged between the main socket body 63 and the latch elements 66, 68, 70, 72 assigned to the connector 10, and thus blocks disengagement of the latch elements 66, 68, 70, 72.

Furthermore, the connector 10 comprises a cable-kink connector 16. The cable-kink protector 16 is of flexible design. The cable-kink protector 16 consists of a thermoplastic material. The cable-kink connector 16 is implemented in one piece. As an alternative, however, it would also be possible for a cable-kink connector to be embodied in a multi-part implementation. The cable-kink protector 16 is formed separately from the plug unit 12. In an installed state, the cable-kink protector 16 engages fully around the plug unit 12. The cable-kink protector 16 here is free of any direct connection to the plug unit 12. Accordingly, the cable-kink protector 16 can be moved in translational fashion relative to the plug unit 12, in particular linearly in the longitudinal-extent direction of the plug unit 12. The cable-kink protector 16 forms, at least partially, an outer housing of the connector 10.

In addition, the cable-kink protector 16 is formed separately from the locking unit 14. The cable-kink protector 16 is fastened on the locking unit 14.

For this purpose, the cable-kink protector 16 has at least one further retaining element 52, 54, 56, 58. In the present case, the cable-kink protector 16 has four further retaining elements 52, 54, 56, 58, wherein in particular each of the retaining elements 26, 28 of the locking unit 14 is assigned one of the further retaining elements 52, 54, 56, 58. The number of further retaining elements 52, 54, 56, 58 here is adapted to the number of retaining elements 26, 28. The further retaining elements 52, 54, 56, 58 are at least essentially identical to one another. The further retaining elements 52, 54, 56, 58 are arranged on further cover surfaces of the cable-kink protector 16, said further cover surfaces being oriented in particular parallel to a main-extent plane of the cable-kink protector 16. In the present case, two of the further retaining elements 52, 54, 56, 58 are arranged on each of the further cover surfaces. The further retaining elements 52, 54, 56, 58 are arranged on a side of the cable-kink protector 16 which is directed toward the front side 39. The further retaining elements 52, 54, 56, 58 are implemented, at least partially, to correspond to the retaining elements 26, 28. The further retaining elements 52, 54, 56, 58 are designed in the form of retaining recesses. As an alternative, however, it would also be possible for a cable-kink protector to have a different number of further retaining elements, for example precisely one further retaining element and/or two further retaining elements. In addition, it would be possible for the numbers of retaining elements and further retaining elements to differ from one another. It is further conceivable for further retaining elements to be arranged on a side surface of the cable-kink protector. Furthermore, it is also conceivable for a cable-kink protector to be implemented in one piece with a locking unit. In addition, it would be possible, in principle, for a cable-kink protector to be embodied in a multi-part implementation. In the installed state, the cable-kink protector 16 engages fully around the locking unit 14. In the present case, the further retaining elements 52, 54, 56, 58 here engage around the retaining elements 26, 28 of the locking unit 14 such that the cable-kink protector 16 is connected in a movable manner to the locking unit 14, in the present case such that it can be moved, in particular, in translational/linear fashion in the longitudinal-extent direction of the plug unit 12.

In addition, the cable-kink protector 16 is configured for accommodating at least one cable (not illustrated) connected to the plug unit 12 and for protecting the same, in particular, against excessive stressing.

For this purpose, the cable-kink protector 16 has a cable-protection portion 32. The cable-protection portion 32 corresponds to a portion of the cable-kink protector 16 which is directed away from the front side 39. The cable-protection portion 32 serves for guiding the at least one cable. The cable-protection portion 32 is at least section-wise rotationally symmetrical. The cable-protection portion 32 can be moved in a flexible manner in a direction other than the longitudinal-extent direction of the plug unit 12. In addition, the cable-protection portion 32 has a plurality of bending recesses 34, which serve for reducing a bending rigidity, as a result of which the cable-protection portion 32 can be moved, in particular, in all directions up to a defined and/or definable radius and protects the at least one cable in an effective manner against kinking. The cable-protection portion 32 here defines a minimum bending radius for the at least one cable. In the present case, a minimum bending radius is at least 25 mm. The cable-kink protector 16 here complies with standard EN 50377-15-1. Accordingly, a maximum tensile force on the cable is at least 2 N, with a direction of tension between −90° to +90°.

Furthermore, the cable-kink protector 16 is configured for indirect actuation of the locking unit 14, in particular during a plugging-in operation. In the present case, the cable-kink protector 16 is configured at least in such a way that a translational compressive force to which the cable-kink protector 16 is subjected, in particular by a user, is transmitted directly to the plug unit 12 and thereby indirectly, via the socket 38, to the locking unit 14, in order to actuate the locking unit 14 and to achieve, in particular, brief unlocking of the locking unit 14, in particular during a plugging-in operation.

Furthermore, the cable-kink protector 16 is configured for direct actuation of the locking unit 14, in particular during an unplugging operation. In the present case, the cable-kink protector 16 is configured at least in such a way that a translational tensile force to which the cable-kink protector 16 is subjected, in particular by a user, is transmitted directly to the locking unit 14, in order to actuate the locking unit 14 and to release, in particular, locking of the locking unit 14, in particular in the state in which the connector 10 is coupled to the socket 38.

For this purpose, the cable-kink protector 16 has an actuation portion 30. The actuation portion 30 corresponds to a portion of the cable-kink protector 16 which is directed toward the front side 39. The actuation portion 30 has rotational symmetry of order 2 in relation to a rotational-symmetry axis which is parallel to the longitudinal-extent direction of the plug unit 12.

The actuation portion 30 comprises at least one first actuation element 60, 62, for direct actuation of the plug unit 12 and/or for indirect actuation of the locking unit 14. In the present case, the actuation portion 30 comprises two first actuation elements 60, 62. The first actuation elements 60, 62 are arranged within the cable-kink protector 16. The first actuation elements 60, 62 are designed in the form of stop elements. The first actuation elements 60, 62 are configured for transmitting a translational compressive force directly to the plug unit 12 during a plugging-in operation.

The actuation portion 30 comprises at least one second actuation element 18, 20, 22, 24, for direct actuation of the locking unit 14. In the present case, the actuation portion 30 comprises four second actuation elements 18, 20, 22, 24. The second actuation elements 18, 20, 22, 24 are designed in the form of stop elements. The second actuation elements 18, 20, 22, 24 are, at least partially, identical to the further retaining elements 52, 54, 56, 58. In the present case, the second actuation elements 18, 20, 22, 24 correspond to a portion and/or a side of the further retaining elements 52, 54, 56, 58 which are/is directed toward the front side 39. The second actuation elements 18, 20, 22, 24 are configured for transmitting a translational tensile force directly to the locking unit 14 during an unplugging operation. For this purpose, the second actuation elements 18, 20, 22, 24 interact with the retaining elements 26, 28 of the locking unit 14.

In the present case, the cable-kink protector 16 therefore performs a double function and allows, on the one hand, effective kink protection and, on the other hand, locking and/or unlocking, and thus in particular a plugging-in and/or an unplugging operation, of the connector 10 by means of a force to which the cable-kink protector 16 is subjected. This means that advantageously straightforward actuation of a connector can be achieved even in confined spaces and/or in the case of a multiplicity of connectors arranged one beside the other.

FIGS. 5, 6*a-d*, 7 and 8*a-d* show the connector system 36 during a plugging-in operation (cf. FIGS. 5 and 6*a-d*) and an unplugging operation (cf. FIGS. 7 and 8*a-d*).

The plugging-in operation corresponds, at least essentially to a known plugging-in operation. By means of the first actuation elements 60, 62, a translational compressive force to which the cable-kink protector 16 is subjected by a user, is transmitted directly to the plug unit 12. The plug unit 12 is introduced into the socket 38 as a result. Once the plug unit 12 has been pushed in by a certain distance, the latch elements 66, 68, 70, 72 assigned to the connector 10 strike against the further latch elements 46. The latch elements 66, 68, 70, 72 assigned to the connector 10 are deflected as a result. It is also the case here that the latch elements 66, 68, 70, 72 assigned to the connector 10 prevent the locking unit 14 from being pushed into the first position, in particular the locking position. Once the latch elements 66, 68, 70, 72 assigned to the connector 10 have latched in behind the latch elements 46, the locking unit 14 is displaced between the main socket body 63 and the latch elements 66, 68, 70, 72 assigned to the connector 10 and thus prevents the latch elements 66, 68, 70, 72 assigned to the connector 10 from being able to be deflected. Accordingly, removal of the plug unit 12 from the socket 38 without actuation of the locking unit 14 is prevented.

Since the cable-kink protector 16 is fastened and/or guided predominantly on the locking unit 14, a translational tensile force to which the cable-kink protector 16 is subjected by a user during the unplugging operation is transmitted directly to the locking unit 14, in particular the retaining elements 26, 28 of the locking unit 14, by means of the second actuation elements 18, 20, 22, 24. The locking unit 14 is thus moved out of the first position, in particular the locking position, into the second position, in particular the unlocking position, as a result of which disengagement of the latch elements 66, 68, 70, 72 assigned to the connector 10 is made possible. In the case of the cable-kink protector 16 being subjected to a sustained translational tensile force, in particular by a user, the latch elements 66, 68, 70, 72 assigned to the connector 10 are deflected by the further latch elements 46 and are pushed over the further latch elements 46 again, in particular such that removal of the plug unit 12 from the socket 38 is made possible.

The invention claimed is:

1. A connector, in particular an optical connector, comprising:
   a plug unit;
   a locking unit, which can be moved in translational fashion relative to the plug unit and, in a coupled state, is configured for locking the plug unit; and
   a cable-kink protector,
   wherein the cable-kink protector is configured for actuating the locking unit directly, and
   wherein the cable-kink protector engages fully around the locking unit.

2. The connector as claimed in claim 1, wherein the cable-kink protector is of at least partially flexible design.

3. The connector as claimed in claim 1, wherein the cable-kink protector can be moved in translational fashion relative to the plug unit.

4. The connector as claimed in claim 1, wherein the cable-kink protector is connected in a movable manner to the locking unit.

5. The connector as claimed in claim 1, wherein the cable-kink protector is configured for transmitting a force to which the cable-kink protector is subjected to the locking unit, in order to actuate the locking unit.

6. The connector as claimed in claim 1, wherein the cable-kink protector has at least one actuation element for direct actuation of the locking unit.

7. The connector as claimed in claim 1, wherein the cable-kink protector is implemented in one piece.

8. The connector as claimed in claim 1, wherein the cable-kink protector is embodied in a multi-part implementation.

9. The connector as claimed in claim 1, wherein the cable-kink protector has an actuation portion, which has a rotational symmetry of order 2.

10. The connector as claimed in claim 1, wherein the cable-kink protector has a cable-protection portion, which is at least section-wise rotationally symmetrical.

11. The connector as claimed in claim 1, wherein the cable-kink protector has a minimum bending radius of at least 10 mm.

12. A connector system having a connector according to claim 1, and having a socket, which can be coupled to the connector.

13. The connector as claimed in claim 1, wherein
the locking unit comprises multiple retaining elements, which are arranged on cover surfaces of a main locking body of the locking unit, said cover surfaces being oriented parallel to a main-extent plane of the locking unit.

14. The connector as claimed in claim 13, wherein
the locking unit comprises at least two retaining elements on each of the cover surfaces.

15. The connector as claimed in claim 1, wherein
the cable-kink protector fully encompasses a circumference of the locking unit.

16. The connector as claimed in claim 1, wherein
the cable-kink protector comprises at least one circular portion sitting upon the cable-kink protector and implemented integrally with the cable-kink protector.

* * * * *